United States Patent

[11] 3,580,305

| [72] | Inventor | Herbert Leslie Wright<br>P. O. Box 179, Philo, Calif. 95466 |
|---|---|---|
| [21] | Appl. No. | 803,580 |
| [22] | Filed | Mar. 3, 1969 |
| [45] | Patented | May 25, 1971 |

[54] SAWING MACHINE
13 Claims, 6 Drawing Figs.

[52] U.S. Cl. .................................................. 143/37,
83/169, 143/157, 143/160
[51] Int. Cl. ...................................................... B27b 5/34
[50] Field of Search ........................................... 143/37,
157.3, 157.7, 158, 160, 56, 164; 83/169

[56] References Cited
UNITED STATES PATENTS

| 193,004 | /1877 | Jenks ........................... | 83/169X |
| 1,036,173 | /1912 | Arey ............................... | 143/158X |
| 2,014,222 | /1935 | Bieling et al. .................. | 143/157X |
| 3,285,302 | /1966 | Thrasher ....................... | 143/37 |

Primary Examiner—William S. Lawson
Assistant Examiner—James F. Coan
Attorney—Flehr, Hohbach, Test, Albritton & Herbert ABSTRACT: A sawing machine with a number of thin blades carried on an arbor includes edge margins guided by fluid bearings defined between guide surfaces disposed on each side of each blade. The spacing between guide surfaces is varied in precise parallelism while precise coplanar blade alignment is derived from consolidating all guides and blades together by forces applied along an axis defined normal to the blades and radially within their guided margins.

INVENTOR.
HERBERT LESLIE WRIGHT
BY
Flehr, Hohbach, Test,
Albritton & Herbert
ATTORNEYS INVENTOR.
HERBERT LESLIE
WRIGHT
BY Flehr, Hohbach, Test,
Albritton & Herbert
ATTORNEYS

SAWING MACHINE

BACKGROUND OF THE INVENTION

This invention pertains to sawing machines of the type having a number of circular saws on a common arbor. More particularly, this invention pertains to means for controlling the planes of the blades in a manner particularly useful in reducing the thickness of the kerf or cut formed by the blade.

Even the slightest reduction in the width of the kerf formed by sawing machines of the type herein provides surprising financial savings and benefits to the operator. Thus, sawmill operators have long sought ways in which to reduce the thickness of their sawblades without causing the blades to become undesirably fragile or weakened.

A number of specific schemes have involved the use of replaceable, consumable elements disposed on opposite sides of the blades to cooperate with the peripheral margin of the blades while the hub portion of each blade remains free to move laterally along its arbor. In this way, the plane of the blade is closely controlled and supported in the region of the kerf.

There has, however, continued to be a need for improved means for guiding the blades of machines of the above type in the region of the kerf.

SUMMARY OF THE INVENTION AND OBJECTS

The present invention provides a sawblade control system which provides maximum precision in the coplanar blade alignment in the region of the peripheral sawblade margins. The system, in general, includes a number of blades on an arbor with their hubs laterally free to move along the arbor. Planar guide plates flank each blade edge margin and are free to be moved toward the plane of the blade. Thus, all blades and guide plates can be, and are, consolidated conjointly together by means urging them all together. No binding occurs between plates and blades due to the provision of means for supplying fluid between the guide plate surfaces and the blade surfaces whereby a fluid "bearing" supports the blades' peripheral margin from both sides. Spacing between blades is defined by means supporting pairs of the guide plates between each pair of blades for moving the pair of plates in precise parallelism between advanced and retracted positions. Accordingly, upon laterally consolidating the blades and guide plates together into their mutual guiding relationships, it is evident that the parallel spaced guide surfaces interposed between the blade margins will determine interblade spacing.

It is a general object of the present invention to provide an improved sawing machine with a view toward further reduction in the width of the kerf made by the blades of the machine.

It is another object of the invention to provide a sawing machine having marginal blade guidance derived from lateral consolidation of blades and guide surfaces in response to laterally compressive forces applied thereto along an axis normal to the blade margins and radially within the periphery of the blades.

Another object of the invention is to provide a sawing machine of the above type wherein interblade spacing is easily and simply varied.

These and other objects of the invention will become more readily apparent from the following detailed description of a preferred embodiment when considered in conjunction with the accompanying drawings.

DESCRIPTION OF THE PREFERRED EMBODIMENT

Figure 1:
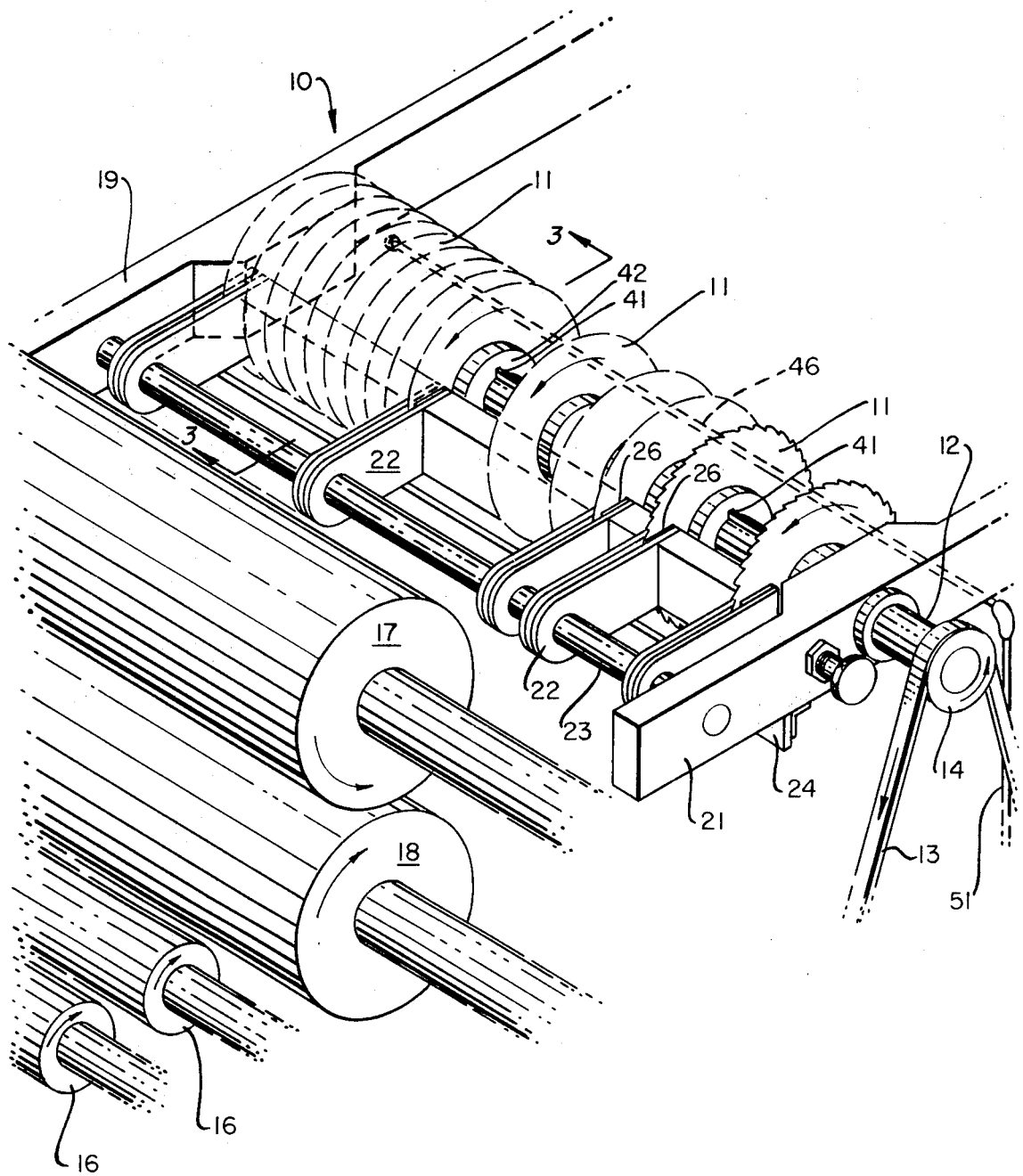
FIG. 1 is a schematic isometric view showing a sawing machine according to the invention.

Referring to the schematic, perspective view shown in FIG. 1 of the sawing machine according to the invention, the sawing machine 10 represents an edger style of saw wherein a number of sawblades 11 are supported and driven by a common arbor 12. Means for driving the arbor have been schematically represented by the drivebelt 13 trained about a drive pulley 14 carried on the arbor.

Machine 10, as shown, includes means for supplying lumber to the blades 11 for cutting as by means of the conventional rollers 16 and a pair of drive rollers 17, 18 of a type, for example, wherein they may be vertically separated by hydraulic lifting means to permit the entry of a log or cant to arrive therebetween and upon entry therebetween, the two rollers are then driven toward each other to pinch the log or cant and cause the log or cant to be fed positively into the blades 11.

The upper surfaces of rollers 16, 18 define the support plane of a supply path for lumber to be cut by blades 11 and means, now to be described, for guiding and supporting the peripheral margins of each of the sawblades have been provided immediately below the level of the plane of the supply path.

Machine 10 includes the laterally spaced frame members 19, 21 located at the side of the lumber supply path. These frame members 19, 21 are rigidly supported by means (not shown).

Guide support arms 22 are mounted loosely upon a stationary rod or axle 23, carried between members 19, 21, whereby the arms may be pivoted freely upwardly from their normal positions lying with their outer portions between pairs of blades 11. In addition, arms 22 are disposed for relatively free movement along the length of rod 23. Underlying the arms 22, a support bar 24 serves as an arm rest upon which each arm 22 will be normally seated.

Each arm 22 includes a portion disposed to enter between adjacent ones of the sawblades 11 to carry thereon pairs of guide plates providing relatively broad, flat guide surfaces disposed to confront the side faces of the peripheral marginal area of each of the blades.

Thus, pairs of guide plates 26 are carried by means, now to be described, on the interposed portions of arms 22 in a manner whereby the spacing between their parallel guide surfaces 27 may be varied while maintaining the guide surfaces 27 in precise parallelism therebetween.

Each guide plate 26 includes a mounting surface 28 which tapers relative to the broad, flat planar guide surface 27.

The mounting surfaces 28 of each guide plate 26 are adapted to ride in sliding engagement with mutually tapered mounting surfaces 29 formed on each of arms 22.

Thus, each arm 22 includes a relieved rectangular portion formed on each side of its outer end to accommodate the mounting of plates 26. The left edge of this relieved region appears in FIG. 3 as the line 31 which represents an abutment or bounding edge of the relieved region.

Figure 3:
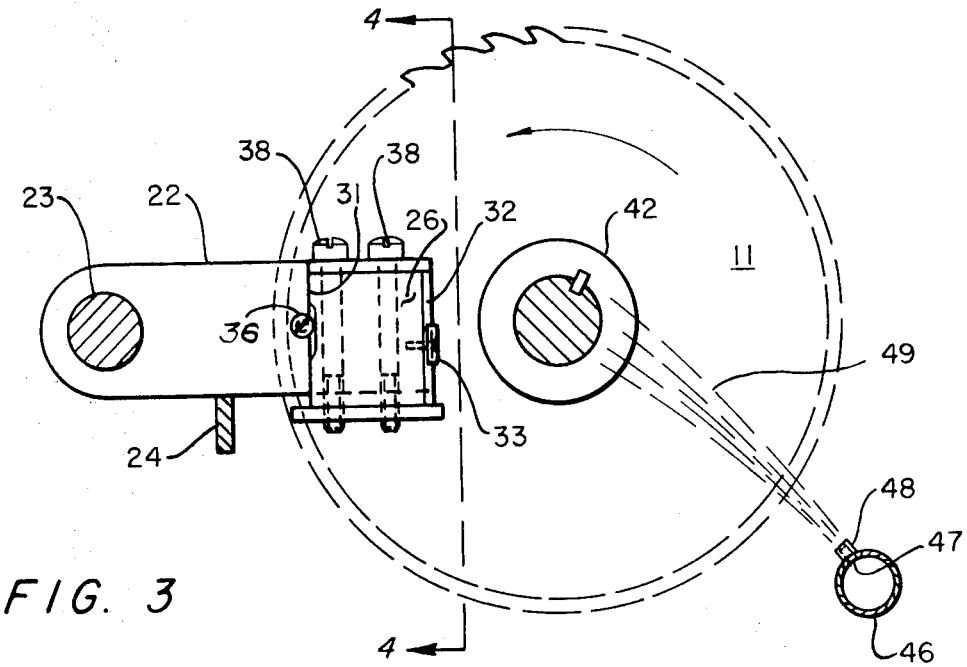
FIG. 3 is a side section view taken along the line 3–3 of FIG. 1.
Figure 4:
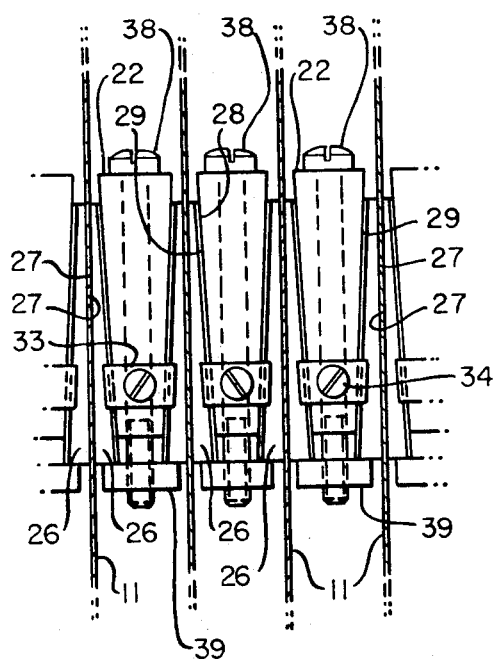
FIG. 4 is an elevation section view taken along the line 4–4 of FIG. 3.

Accordingly, the left edge of plate 26 (as shown in FIG. 3) is held against the abutment 31 by means described further below.

The right edge of plate 26 includes a retaining lip 32 which cooperates with a generally U-shaped retaining clamp 33 formed with its ends bent to overlie in coplanar relation the surface of retaining lips 32. A flathead screw 34 holds clamp 33 attached to the outer end of arm 22.

Figure 5:
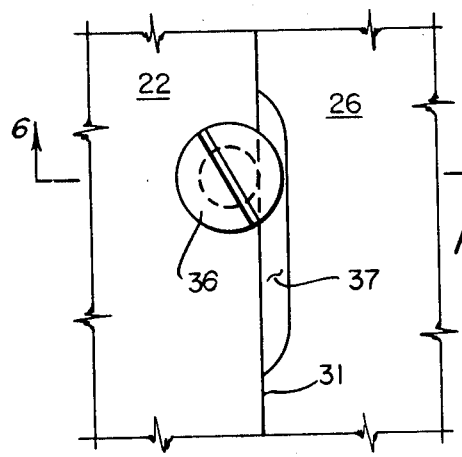
FIG. 5 is an enlarged detail of a portion of FIG. 3.
Figure 6:
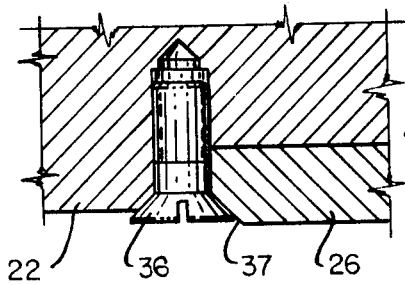
FIG. 6 is a section view of FIG. 5 taken along the line 6–6.

That edge of plates 26 which abuts the shoulder 31 is held against the mounting surfaces 29 of the arm by means of the conically tapered portions of a screw 36 (FIG. 5) which cooperate with the beveled edge 37.

As thus arranged, it is readily evident that the plates 26 can move upwardly and downwardly while carried on the ends of arms 22. During this movement, the spaced planes of guide surfaces 27 carried on a given arm 22 will move between advanced and retracted positions to increase and decrease the spacing therebetween. Accordingly, means have been provided for raising and lowering plates 26 in pairs so as to vary this spacing.

Means for raising and lowering guide plates 26 includes the pair of bolts 38 which extend downwardly in enlarged bores formed vertically in the outer ends of arms 22. The lower ends of bolts 38 are threaded into a lower retainer plate 39 carried therebetween whereby as the heads of bolts 38 are rotated, retainer plate 39 will be raised or lowered as desired. Meanwhile, clamp 33 and the head of screw 36 hold plate 26 in abutting relation with shoulder 31.

With the above arrangement, it is readily evident that in order to increase or decrease the spacing between the parallel planes of guide surfaces 27 formed on guide plates 26, bolts 38 may be merely raised or lowered. This is done by pivoting each of the arm assemblies 22 upwardly about rod 23 where the heads of bolts 38 may be conveniently accessible.

It will also be evident from the above that plates 26 are not necessarily compressed tightly against arm 22 by the above-recited specific means. However, means are provided whereby compression is applied as described further below.

Each of sawblades 11 includes a relatively thin collar portion 42 in the region of its hub which is keyed by means of a key element 41 to the arbor 12 for forming a driving connection between blades 11 and arbor 12. As thus arranged, the hub portions of blades 11 are free to move loosely laterally in the direction of the length of arbor 12. Thus, as the peripheral edge margin of blade 11 is closely controlled to a defined plane established by means of the guiding surfaces 27 flanking the side faces of the marginal portions of blade 11, the central and trailing portions of the blade will be free to adjust to the plane defined by the marginal portion.

Means for urging and consolidating all of the guide plates 26 and blades 11 by movement laterally together into a guiding relationship therebetween determined substantially only by the spacing between the substantially parallel guide surfaces has been readily and simply provided herein by applying forces along an axis defined normal to the blades and radially within their guided margins as now to be described.

Figure 2:
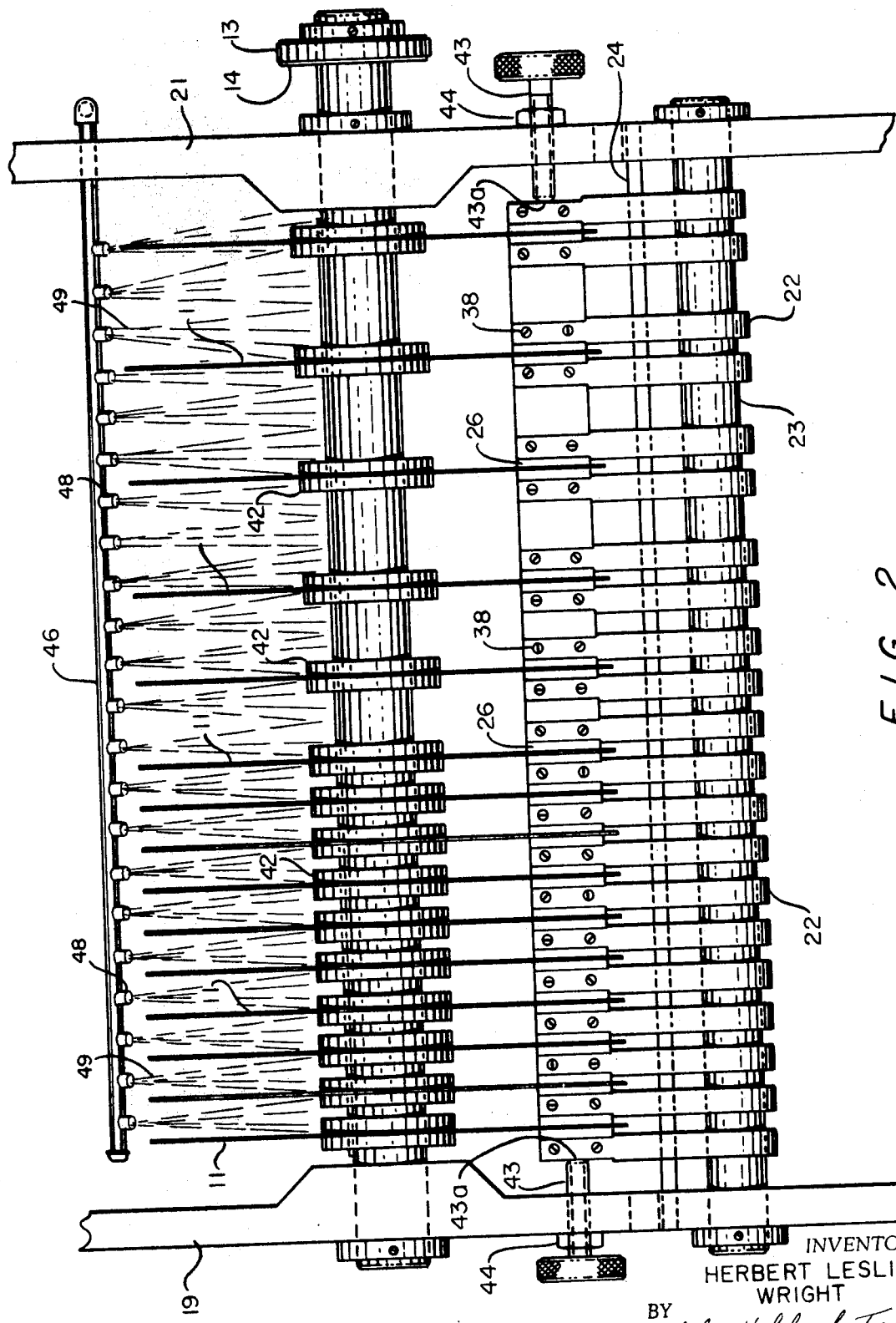
FIG. 2 is a schematic plan view of a sawing machine according to the invention.

Referring to FIG. 2, adjustable studbolts 43 are threaded through the frame members 19, 21 whereby their inner ends 43a contact and compress the side faces of the endmost arms 22. In this manner, all of the arms can be moved along rod 23 to consolidate arms 22 and blades 11. Jamnuts 44 serve to hold bolts 43 in a predetermined position.

Under the application of the applied force of bolts 43, all of the broad, planar, flat guiding surfaces of guide plates 26 will bear solidly against the side of blades 11.

Accordingly, means serving to direct a flow of liquid between the sawblade faces and their respectively associated guide surfaces of the plates 26 includes an arrangement for directing a spray of liquid to strike radially inwardly of the saw face at a location so that it can be carried outwardly over an enlarging radius of the sawblade prior to entry between the guide surface and the face of the sawblade.

In the above manner, a fluid "bearing" is formed between the guide surfaces of plates 26 and the side faces of blades 11 thereby prolonging the life of the guide plates 26 and blades 11 under conditions of utmost support to the plane of the blades 11 in the region of the kerf.

Thus, a transversely extending tube or pipe 46, formed with a number of longitudinally spaced ports 47, fitted, if desired, with nozzles 48, extends along and beneath blades 11 in a position whereby the ports 47 eject a stream 49 of lubricating liquid such as water treated with a suitable wetting agent, supplied from an input line 51 leading from a supply pump (not shown).

From the above, it will be readily evident that there has been provided means for guiding the peripheral margin of a number of sawblades in closely controlled planes in a manner whereby the spacing between blades can be readily adjusted and wherein the interblade spacing is determined by the guide plates themselves as compressed by means of the studbolts 43 serving to apply compressive forces to move both the blades and the arms conjointly into consolidated guiding relationship therebetween. The rear or mounting ends of the arms 22 as carried on rods 23 are free to move laterally relative to each other and are unobstructed therebetween.

By providing the fluid "bearing" support on flanking sides of the sawblades and by guiding them utilizing the consolidating force applied along an axis lying normal to the blades and radially within the periphery of the blades, it has been possible to achieve a substantial additional reduction in the thickness of sawblades employed in a machine of the above type. For example, utilizing equipment of the kind described above, it is now possible to form a kerf in a lumbermill operation less than 0.1 of an inch.

I claim:

1. In a sawing machine of a type having a plurality of rotating circular sawblades on an arbor, the combination of a plurality of support arms having portions thereof disposed to enter between adjacent ones of the sawblades, pairs of guide plates carried by said portions of said arms and flanking the opposite sides of said sawblades, means for adjusting said guide plates to move between advanced and retracted positions relative to the planes of said saws while maintaining said plates in parallel relation relative to an associated one of said saw planes, said pairs of said guide plates serving to guide said blades at the leading edge thereof, said means for adjusting the guide plates between advanced and retracted positions including oppositely tapered broad, flat surfaces between the back of each guide plate element and said portions of said support arms, and means for simultaneously drawing both of the guide plates of a given arm relative to said arm portions to vary the spacing between the guide surfaces of the two guide plates of the arm.

2. In a sawing machine of the type having a plurality of circular sawblades driven by a common arbor, means for closely controlling the plane of the sawblades including a guide plate having a relatively broad, substantially flat, guide surface portion for confronting the side face of a sawblade to form a bearing surface relative thereto, a support arm carrying said guide plate, said arm being movable between advanced and retracted positions to dispose said surface portion in said confronting position when advanced, and means carried by said arm for adjusting said guide plate to move said guide surface relative to the plane of an associated one of said blades while maintaining said surface substantially parallel to the plane of the associated saw.

3. In a sawing machine of the type having a plurality of circular sawblades guided in planes at their leading peripheral margins and supported for rotation upon a common arbor, a sawblade control assembly comprising guide plates having broad, flat guide surfaces on one side thereof for confronting the side face of a sawblade to form a bearing surface relative thereto and having mounting surfaces on their opposite sides, laterally movable support means disposing the guide surfaces of the plates in confronting relation to side faces of said sawblades, said support means further cooperating with said mounting surfaces of the plates to maintain said guide surfaces parallel while varying the spacing between said guide surfaces, and means serving to move all said guide surfaces and peripheral blade margins conjointly laterally together into guiding relation therebetween to define the interblade spacing established by the selected spacing defined between adjacent pairs of the guide surfaces.

4. In a sawing machine according to claim 3 further including means serving to direct a flow of liquid between said sawblade faces and their respectively associated guide surfaces of the plates.

5. In a sawing machine of a type having a plurality of rotating blades on a common axis, a blade control system comprising means for mounting adjacent leading portions of said blades, relatively broad guide plates each having a guide surface movable laterally into guiding relation relative to the plane of the peripheral margin of an associated one of the saws, said peripheral saw margins being movable laterally to vary the disposition of the planes thereof, and means for conjointly moving and consolidating the guide surfaces and blade margins together into mutual guiding relation therebetween, the consolidation thereof being limited substantially only by the spacing between said guide surfaces and serving to determine the lateral spacing between said blade margins.

6. In a sawing machine according to claim 5 wherein said means for supporting said guide plates carries said guide surfaces for adjustment laterally between advanced and retracted positions relative to said blade while maintaining a substantially parallel planar relation between said blades and guide surfaces to vary the spacing between pairs of said blades.

7. In a sawing machine of the type having a plurality of circular sawblades guided in planes at their leading peripheral margins and supported on a common arbor for rotation, the combination comprising guide support arms, guide plates carried by the arms and having relatively broad guide surfaces for confronting and guiding said sawblades, said guide surfaces being disposed on opposite sides of each of said sawblades, means for moving said guide surfaces in pairs between advanced and retracted positions relative to the marginal guide planes of saws associated therewith while maintaining said guide surfaces in substantially parallel relation thereto and serving further to guide said peripheral margin of the saw associated with each of the first named said pair, said guide plates and peripheral blade margins being disposed for lateral movement to provide a guiding relation therebetween, and means serving to urge and consolidate said guide plates and blades laterally together into said guiding relation therebetween, said guiding relation then being determined by the spacing between the substantially parallel guide surfaces.

8. In a sawing machine of the type having a plurality of circular sawblades guided in planes at their leading peripheral margins and supported on a common arbor for rotation, the combination comprising guide support arms, guide plates carried by the arms and having relatively broad guide surfaces for confronting and guiding said sawblades, said guide surfaces being disposed on opposite sides of each of said sawblades, means carried by each arm for moving said guide surfaces in pairs between advanced and retracted positions relative to the marginal guide planes of saws associated therewith while maintaining said guide surfaces in substantially parallel relation thereto and serving further to guide said peripheral margin of the saw associated with each of the first named said pair, said guide plates and peripheral blade margins being disposed for lateral movement to provide a guiding relation therebetween.

9. In a sawing machine, in combination, a plurality of circular sawblades mounted on an arbor for rotation, said blades being free to move in a direction along the arbor, means including guide plates disposed on opposite sides of each blade at the outer margin thereof, means supporting said guide plates to be laterally movable relative to the plane of an associated sawblade and in a direction parallel to the first named said direction, means for applying a laterally compressive force to said blades and plates conjointly along an axis normal to the blade margins and disposed within the periphery of the blades.

10. In a sawing machine of the type having a plurality of rotating blades on a common axis, means including laterally spaced guide surfaces interposed between spaced pairs of blades, said guide surfaces being disposed to confront and cooperate with leading portions of said blades and to move laterally relatively toward and away from the plane of the radially outer margin of the blades, said planes also being movable laterally, and means for initiating and applying compressive forces in an axis defined normal to the blades and through said guide surfaces, said axis lying radially within the guided margins of the blades to conjointly move and consolidate the guide surfaces and blade margins together into mutually guiding relation therebetween, the consolidation thereof serving to define the lateral spacing between adjacent blade margins.

11. In a sawing machine, a plurality of rotating blades on a common axis, means including laterally spaced guide surfaces interposed between spaced pairs of blades, means for varying the spacing between said guide surfaces while maintaining parallelism therebetween, said guide surfaces being disposed to cooperate with leading portions of said blades to maintain the plane of each blade margin parallel to the plane of the others, and means for introducing fluid between the guide surfaces and said blades to form a fluid bearing therebetween to aid in maintaining said blade margin in its plane.

12. In a sawing machine the combination comprising a number of circular sawblades, an arbor supporting the blades to rotate said blades in common, the planes of the blades being laterally movable for adjustment, guide means providing parallel planar bearing surfaces disposed between adjacent pairs of the blades in confronting, guiding relation to the planes of the leading edges of the blades to maintain precise spaced, coplanar blade alignment between adjacent blades, and means for consolidating all guides and blades together by applied forces originated in an axis defined normal to the blades and radially within their guided margins.

13. In a sawing machine, the combination according to claim 12 further including means adjustably supporting said guide means to move pairs of said bearing surfaces in parallelism between retracted and advanced positions relative to each other to vary the spacing between pairs of said surfaces.